(12) United States Patent
Pan et al.

(10) Patent No.: US 8,548,275 B2
(45) Date of Patent: Oct. 1, 2013

(54) IMAGE PROCESSING DEVICE AND IMAGE PROCESSING METHOD

(75) Inventors: Chia-Ho Pan, Tainan County (TW); Po-Jung Lin, Hsinchu County (TW); Da-Ming Chang, Kaohsiung (TW); Yen-Ping Teng, Tainan (TW); Shuei-Lin Chen, Kaohsiung (TW)

(73) Assignee: Altek Corporation, Science Park, Hsinchu (TW)

( * ) Notice: Subject to any disclaimer, the term of this patent is extended or adjusted under 35 U.S.C. 154(b) by 479 days.

(21) Appl. No.: 13/027,271

(22) Filed: Feb. 15, 2011

(65) Prior Publication Data

US 2012/0106860 A1    May 3, 2012

(30) Foreign Application Priority Data

Oct. 29, 2010   (TW) .............................. 99137289 A (51) Int. Cl.
*G06K 9/36*    (2006.01)

(52) U.S. Cl.
USPC ........... 382/304; 382/305; 382/284; 382/260; 700/13; 700/24; 700/25; 700/27; 345/534; 345/564

(58) Field of Classification Search
USPC ................. 382/304, 305, 284, 260; 345/534, 345/564; 700/11–13, 23–25, 27
See application file for complete search history.

(56) References Cited

U.S. PATENT DOCUMENTS 4,266,281 A * 5/1981 Struger et al. .................. 700/83

* cited by examiner

*Primary Examiner* — Chan S Park
*Assistant Examiner* — Mark Roz
(74) *Attorney, Agent, or Firm* — Winston Hsu; Scott Margo (57) ABSTRACT

An image processing method applied to an image processing device is capable of implementing bitstream stitching technique after interrupting image processing process. The image processing method includes steps of processing the i-th slice of N slices in an image to generate a plurality of first processed data; storing the first processed data in a memory unit; once an interrupting request is generated according to a requested process, storing stitching information associated with the last first processed data after processing the i-th slice; stopping processing the image and executing the requested process according to the interrupting request; continuing to process the (i+1)-th slice of the N slices to generate a plurality of second processed data after the requested process is finished; and storing the second processed data after the last first processed data in the memory unit according to the stitching information.

20 Claims, 8 Drawing Sheets

IMAGE PROCESSING DEVICE AND IMAGE PROCESSING METHOD

BACKGROUND OF THE INVENTION

1. Field of the Invention

The invention relates to an image processing device and an image processing method and, more particularly, to an image processing device and an image processing method capable of implementing bitstream stitching technique after interrupting image processing process.

2. Description of the Prior Art

Since some digital still cameras have smaller pixels, such as 3 million or 5 million pixels, than others, their processing time is shorter and can be accepted by users. However, when an image with larger pixels is encoded, it will spend a lot of time for encoding the whole image. If a user wants to display a currently captured image, which has not been encoded completely yet, the decoding process of the currently captured image can only be performed after the encoding process of the currently captured image has been completed. If the currently captured image is displayed after being encoded completely for a long time, the user will dislike waiting on the encoding process and have worse user experience. Therefore, the solution of the prior art is to generate and display a small image in advance and then encode the whole image behind the background gradually.

However, if the user wants to compare the currently captured image with the previously captured image in time, so far the solution of the prior art still has to encode the whole currently captured image first and the previously captured image can be then decoded and displayed. Accordingly, the delay of the processing time still cannot be solved.

In the prior art, one method for solving the aforesaid problems is to drop the encoded parts of the currently captured image and decode the previously captured image first, such that the user will not feel the delay while the previously captured image is requested to be displayed. However, the drawback of the method is that the encoded parts have to be dropped completely from the memory card and then the currently captured image has to be re-encoded again after decoding the previously captured image. If the user wants to display another image continuously, the encoding process of the currently captured image will not be finished consequently. Furthermore, it may not be easy to drop all of the encoded parts and it consumes lots of power and calculation resource.

SUMMARY OF THE INVENTION

An objective of the invention is to provide an image processing device and an image processing method capable of implementing bitstream stitching technique after interrupting image processing process, so as to solve the aforesaid problems.

According to one embodiment, the image processing method of the invention is used for processing an image, wherein the image is divided into N slices and N is a positive integer larger than one. The image processing method comprises steps of processing an i-th slice of the N slices to generate a plurality of first processed data, wherein i is a positive integer smaller than N; storing the first processed data in a memory unit; determining whether the i-th slice has been processed completely; if the i-th slice has been processed completely, determining whether an interrupting request is generated; once the interrupting request is generated according to a requested process, such as a decoding process of a previously captured image, storing a stitching information associated with a last first processed datum of the first processed data; stopping processing the image and executing the requested process according to the interrupting request; continuing to process an (i+1)-th slice of the N slices to generate a plurality of second processed data after the requested process is finished; and storing the second processed data after the last first processed datum in the memory unit according to the stitching information.

According to another embodiment, the image processing device of the invention is used for processing an image, wherein the image is divided into N slices and N is a positive integer larger than one. The image processing device comprises a memory unit, a stitching information recording unit, a processing unit and a control unit. The processing unit is used for processing an i-th slice of the N slices to generate a plurality of first processed data, wherein i is a positive integer smaller than N. The control unit is used for storing the first processed data in the memory unit and determining whether the i-th slice has been processed completely. If the i-th slice has been processed completely, the control unit determines whether an interrupting request is generated. Once the interrupting request is generated according to a requested process, such as a decoding process of another image, the control unit records a stitching information associated with a last first processed datum of the first processed data in the stitching information recording unit and controls the processing unit to stop processing the image and to execute the requested process according to the interrupting request. The control unit controls the processing unit to continue to process an (i+1)-th slice of the N slices to generate a plurality of second processed data after the requested process is finished. Then, the control unit stores the second processed data after the last first processed datum in the memory unit according to the stitching information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
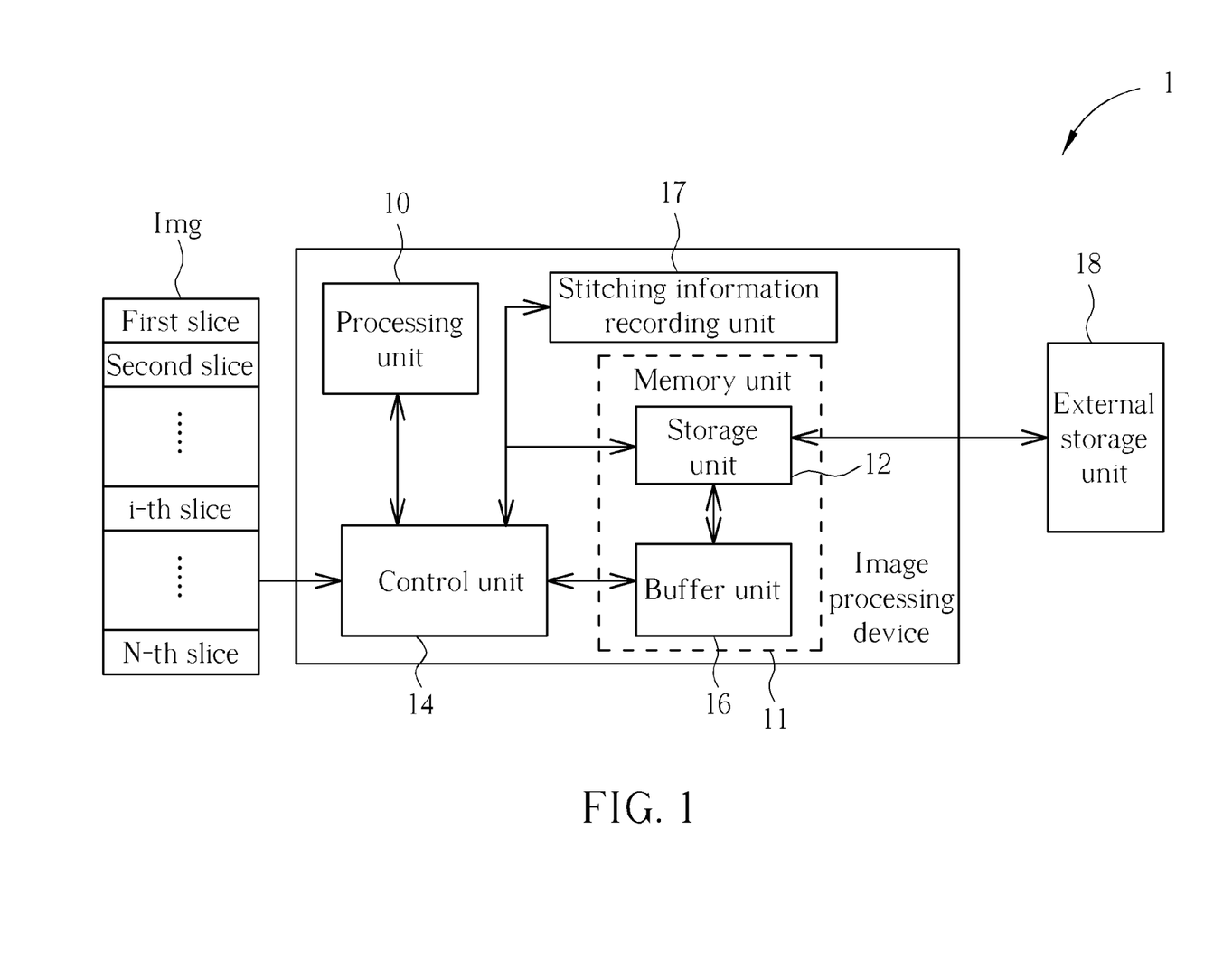
FIG. 1 is a functional block diagram illustrating an image processing device according to one embodiment of the invention.

Referring to FIG. 1, FIG. 1 is a functional block diagram illustrating an image processing device 1 according to one embodiment of the invention. The image processing device 1 can be used to process an image Img, such as image encoding process or image processing process. The image Img is divided into N slices and N is a positive integer larger than one. It should be noted that the number of slices of the image Img can be determined based on practical applications. In other words, one or more slices can be chosen as a base unit for image processing process.

As shown in FIG. 1, the image processing device 1 comprises a processing unit 10, a memory unit 11, a control unit 14 and a stitching information recording unit 17, and the memory unit 11 comprises a storage unit 12 and a buffer unit 16. The image processing device 1 can be electrically connected to an external storage unit 18 for purpose of data exchange. For example, the image processing device 1 can upload data to the external storage unit 18 or download data from the external storage unit 18. The image processing device 1 can be applied to various electronic apparatuses including digital still camera, digital video camera, mobile phone or other electronic apparatuses with image capturing function, and so on.

In this embodiment, the processing unit 10 can be a module with image encoding function or image processing function. The storage unit 12 can be a dynamic random access memory (DRAM). The buffer unit 16 can be a buffer memory or a static random access memory (SRAM). The stitching information recording unit 17 can be a register or on-chip random access memory (OCRAM). The control unit 14 can be a controller or a processor with data processing/calculating function. In practical applications, the image Img is captured by an image sensor (not shown) installed within the electronic apparatus, wherein the image sensor can be a charge coupled device (CCD) image sensor or a complementary metal oxide semiconductor (CMOS) image sensor. The external storage unit 18 can be a memory card.

The following depicts how to implement bitstream stitching technique after interrupting image processing process and continuing to process unprocessed parts of an image. For purpose of description, the processing unit 10 is served as a module with image encoding function in the following embodiment, so as to depict how to implement bitstream stitching technique after interrupting image processing process and continuing to process unprocessed parts of an image once the image processing device 1 receives an interrupting request. Similarly, if the processing unit 10 is served as a module with image processing function and the image processing device 1 receives an interrupting request of an image post-processing process while processing an encoding process or an image pre-processing process, the image processing device 1 will stop current process and execute the image post-processing process first. After finishing the image post-processing process, the image processing device 1 can also utilize the following bitstream stitching technique to continue to process the image pre-processing process.

In this embodiment, the processing unit 10 is controlled by the control unit 14 to encode the image Img, so as to generate a plurality of processed data, such as encoded data. Afterward, the control unit 14 stores the processed data in the buffer unit 16 first and then transfers the processed data from the buffer unit 16 to the storage unit 12 once the buffer unit 16 is filled with the processed data. Finally, the control unit 14 transfers the processed data from the storage unit 12 to the external storage unit 18 according to the capacity of the storage unit 12.

Figure 2A:
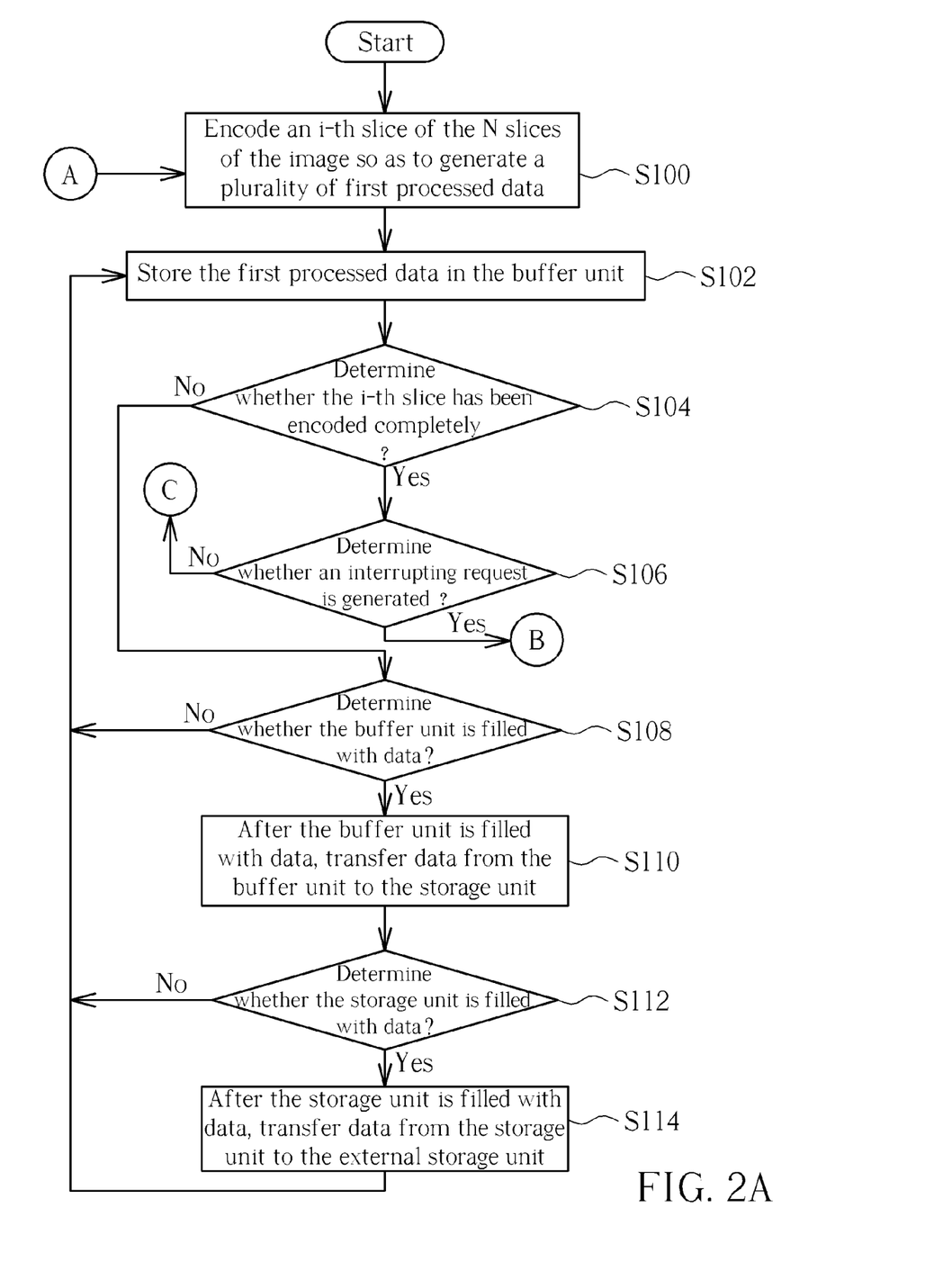
FIGS. 2A and 2B are flowcharts showing an image processing method according to a first embodiment of the invention.
Figure 2B:
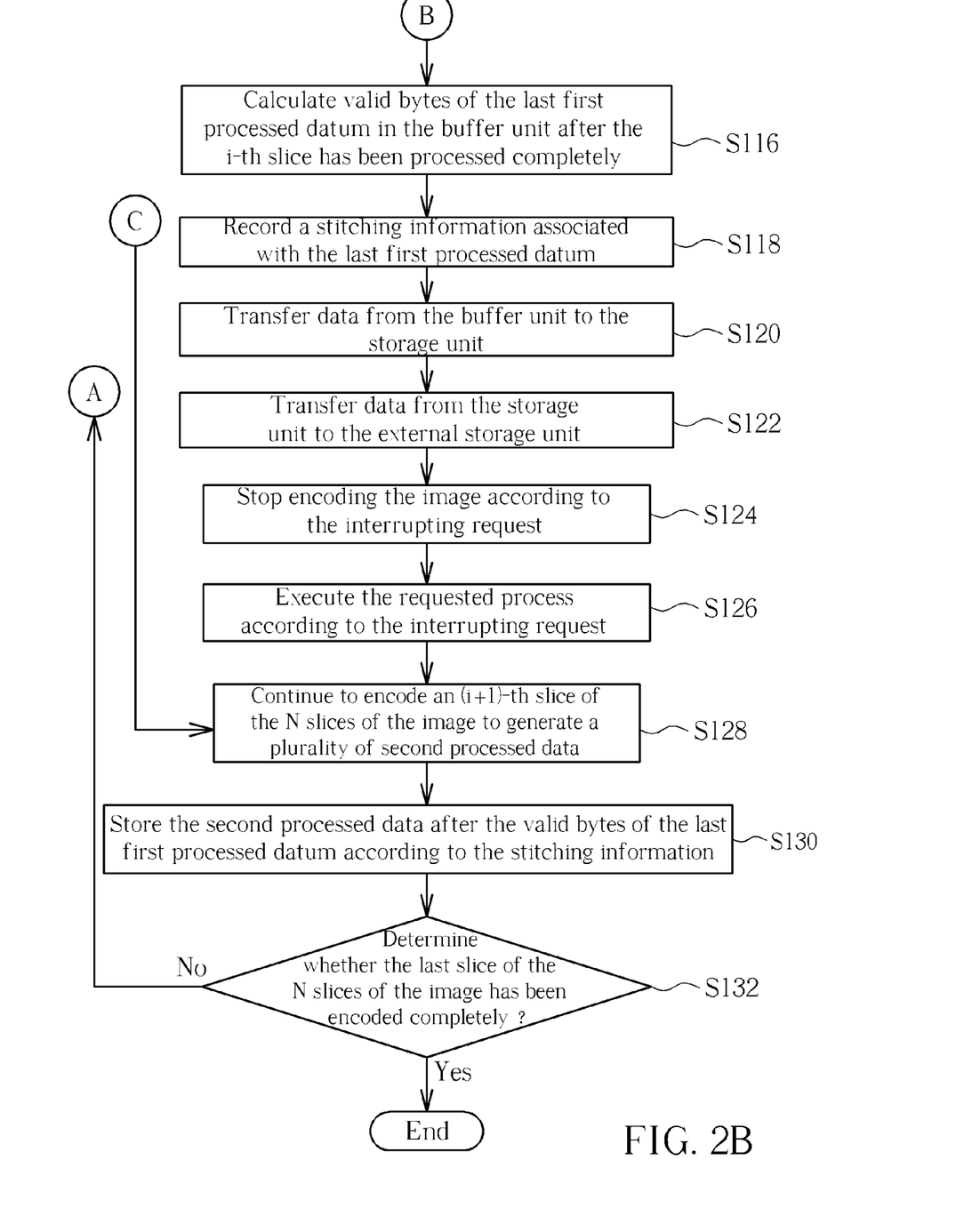
Figure 3:
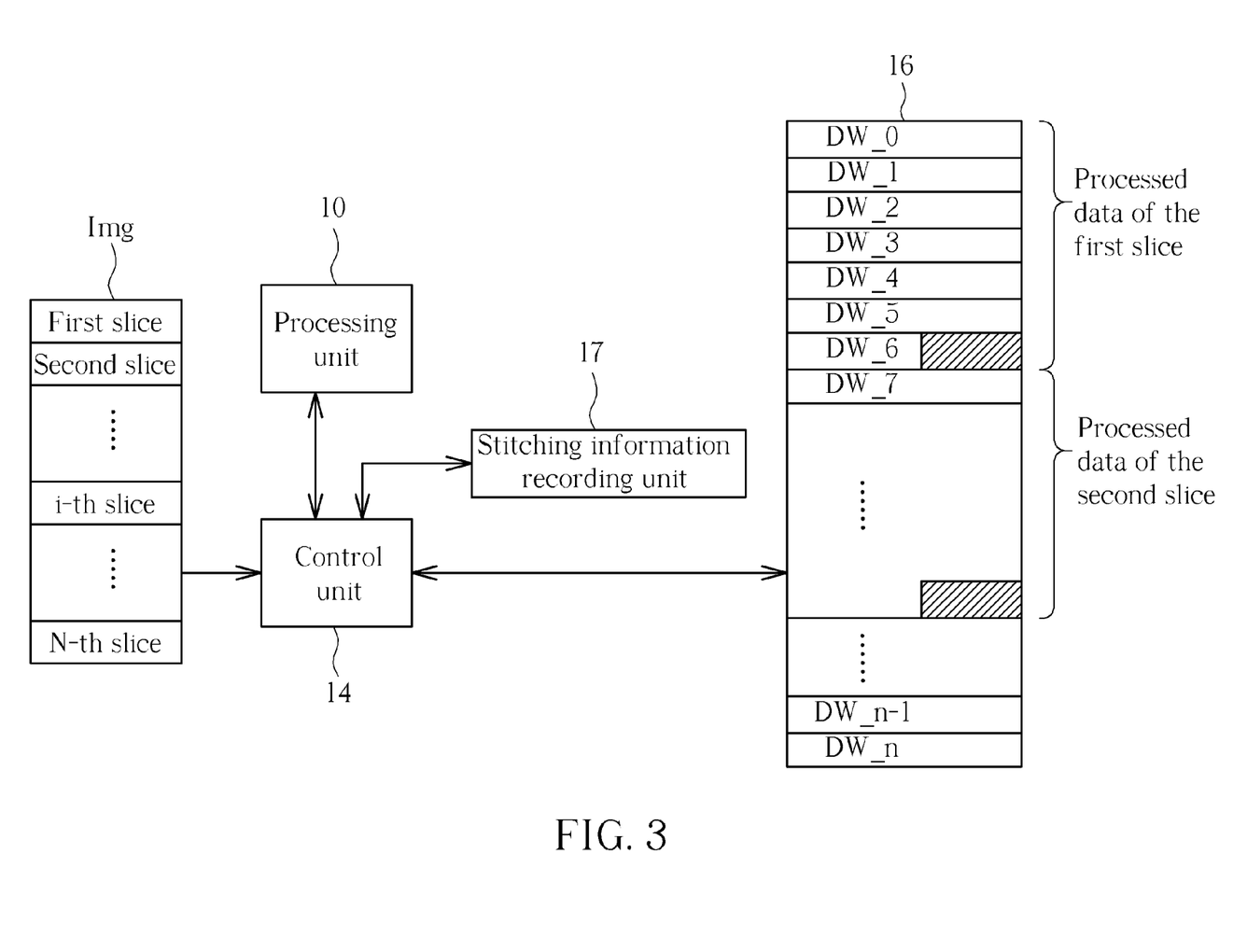
FIG. 3 is a schematic diagram illustrating the processed data stored in the buffer unit.

Referring to FIGS. 2A, 2B and 3, FIGS. 2A and 2B are flowcharts showing an image processing method according to a first embodiment of the invention, wherein the first embodiment is adapted to bitstream output by the processing unit 10 or hardware structure is limited to double word; and FIG. 3 is a schematic diagram illustrating the processed data stored in the buffer unit 16. Please also refer to FIG. 1. For example, when the processing unit 10 is encoding an i-th slice of the N slices of the image Img so as to generate a plurality of first processed data (step S100), the processing unit 10 will encode the i-th slice completely and then the control unit 14 will store the first processed data in the buffer unit 16 (step S102), wherein i is a positive integer smaller than N. Afterward, the control unit 14 determines whether the i-th slice has been encoded completely (step S104). If the i-th slice has not been encoded completely yet, step S108 is then performed. If the i-th slice has been encoded completely, step S106 is then performed. In step S108, the control unit 14 determines whether the buffer unit 16 is filled with the first processed data. If the buffer unit 16 is not filled with the first processed data yet, step S102 is then performed. After the buffer unit 16 is filled with the first processed data, the control unit 14 transfers the first processed data from the buffer unit 16 to the storage unit 12 (step S110). Similarly, the control unit 14 determines whether the storage unit 12 is filled with the first processed data (step S112). If the storage unit 12 is not filled with the first processed data yet, step S102 is then performed. After the storage unit 12 is filled with the first processed data, the control unit 14 transfers the first processed data from the storage unit 12 to the external storage unit 18 (step S114).

In this embodiment, bitstream output by the processing unit 10 and hardware structure is limited to double word. Furthermore, the minimum unit of memory address of the buffer unit 16 and the storage unit 12 is in compliance with double word format and the first processed data is limited to double word alignment. Once the control unit 14 receives an interrupting request according to a requested process (e.g. browsing request for browsing an encoded image or other operating/processing requests) during the encoding process of each slice, the control unit 14 will determine whether the i-th slice has been encoded completely first (step S104). If the i-th slice has not been encoded completely yet, step S108 is then performed. If the i-th slice has been encoded completely, step S106 is then performed. It should be noted that since the control unit 14 has to stop the encoding process while receiving the interrupting request, the first processed data stored in the buffer unit 16 is not always in compliance with double word alignment. As shown in FIG. 3, DW_0 through DW_n represent memory addresses in compliance with double word format. Take the first slice of the image Img for example. Since the encoded last first processed datum of the first slice is not compliance with double word alignment, the memory address DW_6 cannot be filled with the first processed data of the first slice.

In step S106, the control unit 14 determines whether an interrupting request is generated. As mentioned in the above, when the processing unit 10 is encoding the i-th slice and the control unit 14 receives an interrupting request according to a requested process, the control unit 14 calculates valid bytes of the last first processed datum in the buffer unit 16 after the i-th slice has been processed completely (step S116). Afterward, the control unit 14 records a stitching information associated with the last first processed datum in the stitching information recording unit 17 (step S118), wherein the stitching information comprises a double word address and the valid bytes and double word data of the last first processed datum. Then, the first processed data is transferred from the buffer unit 16 to the storage unit 12 (step S120) and further transferred from the storage unit 12 to the external storage unit 18 (step S122). Afterward, the control unit 14 controls the processing unit 10 to stop encoding the image Img (step S124) and to execute the requested process (step S126) according to the interrupting request. After the requested process is finished, the control unit 14 controls the processing unit 10 to continue to encode an (i+1)-th slice of the N slices of the image Img to generate a plurality of second processed data (step S128), wherein the second processed data is also limited to double word alignment since the processing unit 10 and hardware structure is limited to double word format. According to the stitching information mentioned in the above, the control unit 14 reads the stitching information associated with the last first processed datum so as to determine the last valid data and then stores the second processed data after the valid bytes of the last first processed datum in the buffer unit 16 (step S130).

If the control unit 14 does not receive an interrupting request in step S106, the control unit 14 controls the processing unit 10 to continue to encode the (i+1)-th slice of the N slices of the image Img to generate the plurality of second processed data (step S128). Finally, the control unit 14 determines whether the last slice of the N slices of the image Img has been encoded completely (step S132). If it is NO in step S132, step S100 is then performed to continue to encode the image Img until the image Img is encoded completely. If it is YES in step S132, the encoding process is then finished.

Furthermore, the image processing method shown in FIGS. 2A and 2B is also adapted to bitstream output by the processing unit 10 or hardware structure is limited to double word and the minimum unit of memory address is byte. That is to say, when the unit of memory address of the buffer unit 16 is byte, it is unnecessary to store valid bytes and the control unit 14 can trace the valid byte address of the last processed datum immediately, so as to continue the encoding process. Therefore, if the minimum unit of memory address is byte, where the next process should start can be recorded by using the valid byte address.

Figure 4A:
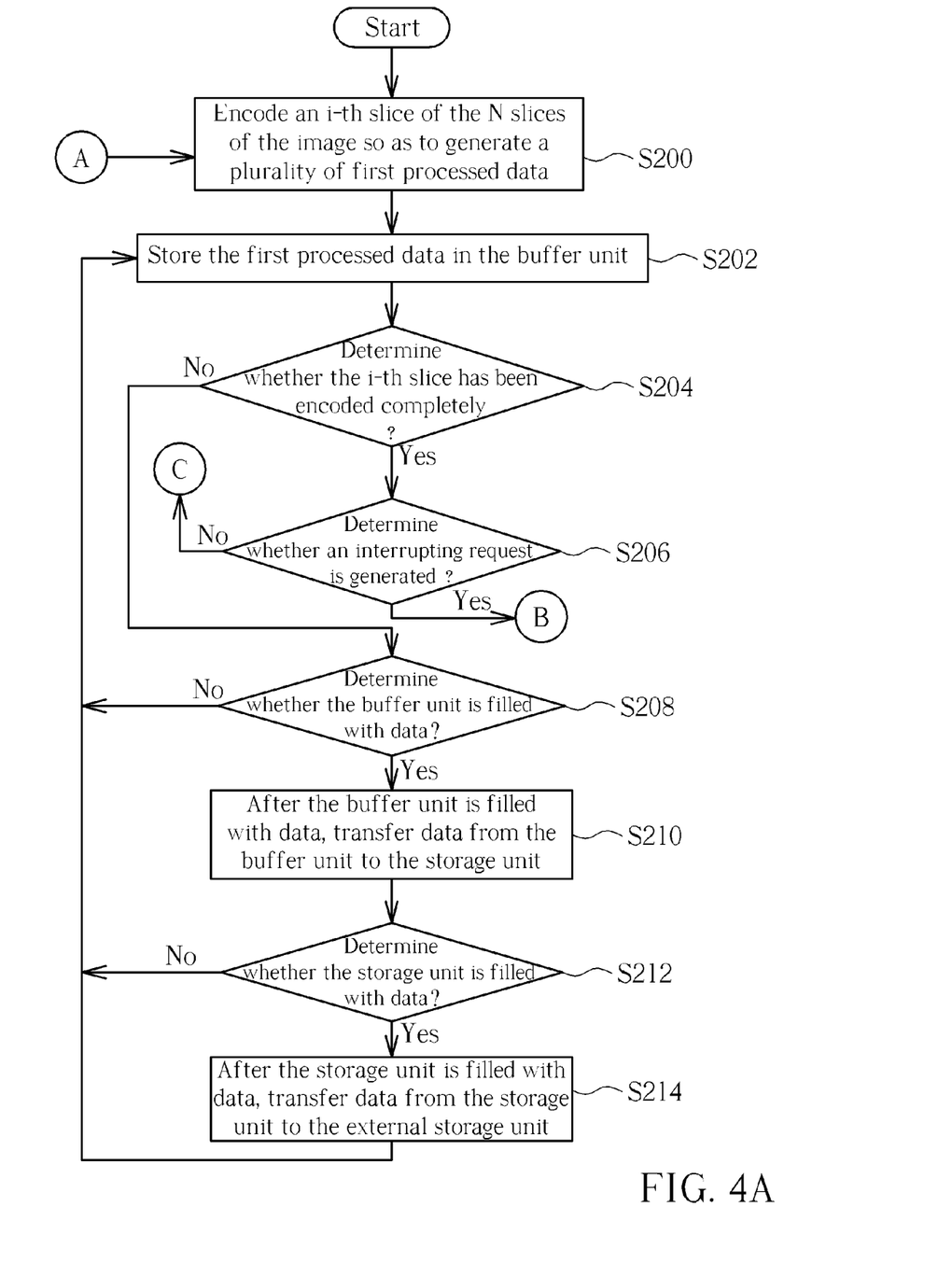
FIGS. 4A and 4B are flowcharts showing an image processing method according to a second embodiment of the invention.
Figure 4B:
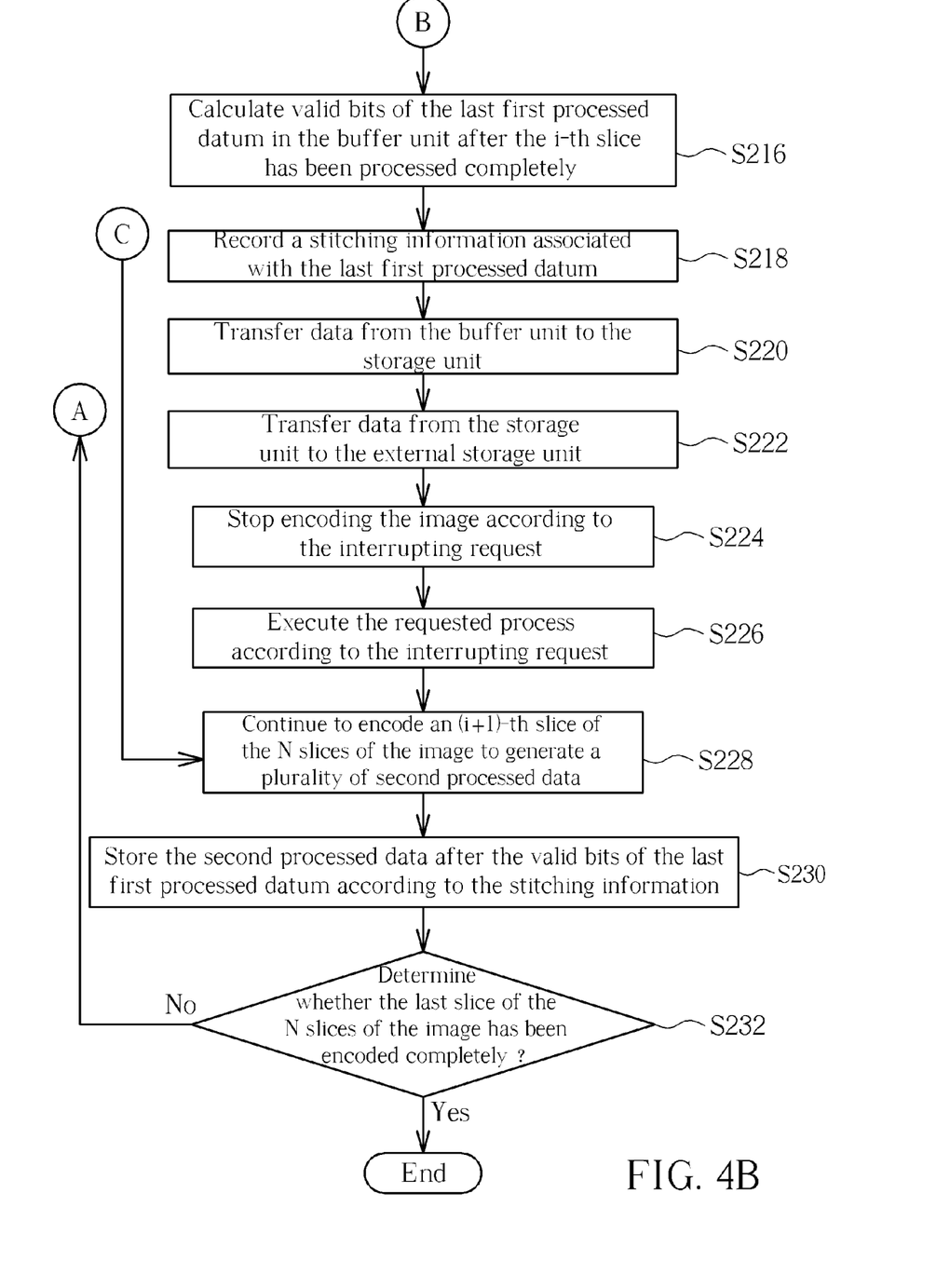

Referring to FIGS. 4A and 4B, FIGS. 4A and 4B are flowcharts showing an image processing method according to a second embodiment of the invention, wherein the second embodiment is adapted to bitstream output by the processing unit 10 or hardware structure is limited to bit and the minimum unit of memory address is byte. The main difference between the second embodiment and the aforesaid first embodiment is that if the bitstream output by the processing unit 10 or hardware structure is limited to bit and the first processed data is limited to byte alignment, the stitching information recorded in step S218 comprises a byte address and valid bits and byte data of the last first processed datum within the storage unit 12. Therefore, after the requested process is finished, the control unit 14 controls the processing unit 10 to continue to encode the (i+1)-th slice of the N slices of the image Img to generate a plurality of second processed data (step S228), wherein the second processed data is also limited to byte alignment. Afterward, according to the stitching information mentioned in the above, the control unit 14 reads the stitching information associated with the last first processed datum so as to determine the last valid data and then stores the second processed data after the valid bits of the last first processed datum in the buffer unit 16 (step S230).

It should be noted that, the steps S200-S216, S220-S226 and S232 of FIGS. 4A and 4B are substantially similar to the steps S100-S116, S120-S126 and S132 of FIGS. 2A and 2B, so they will not be described herein again.

It should be noted that regarding the aforesaid first and second embodiments, the memory unit 11 of the image processing device 1 may not comprise the buffer unit 16. In this manner, the control unit 14 will store data in the storage unit 12 immediately.

Figure 5A:
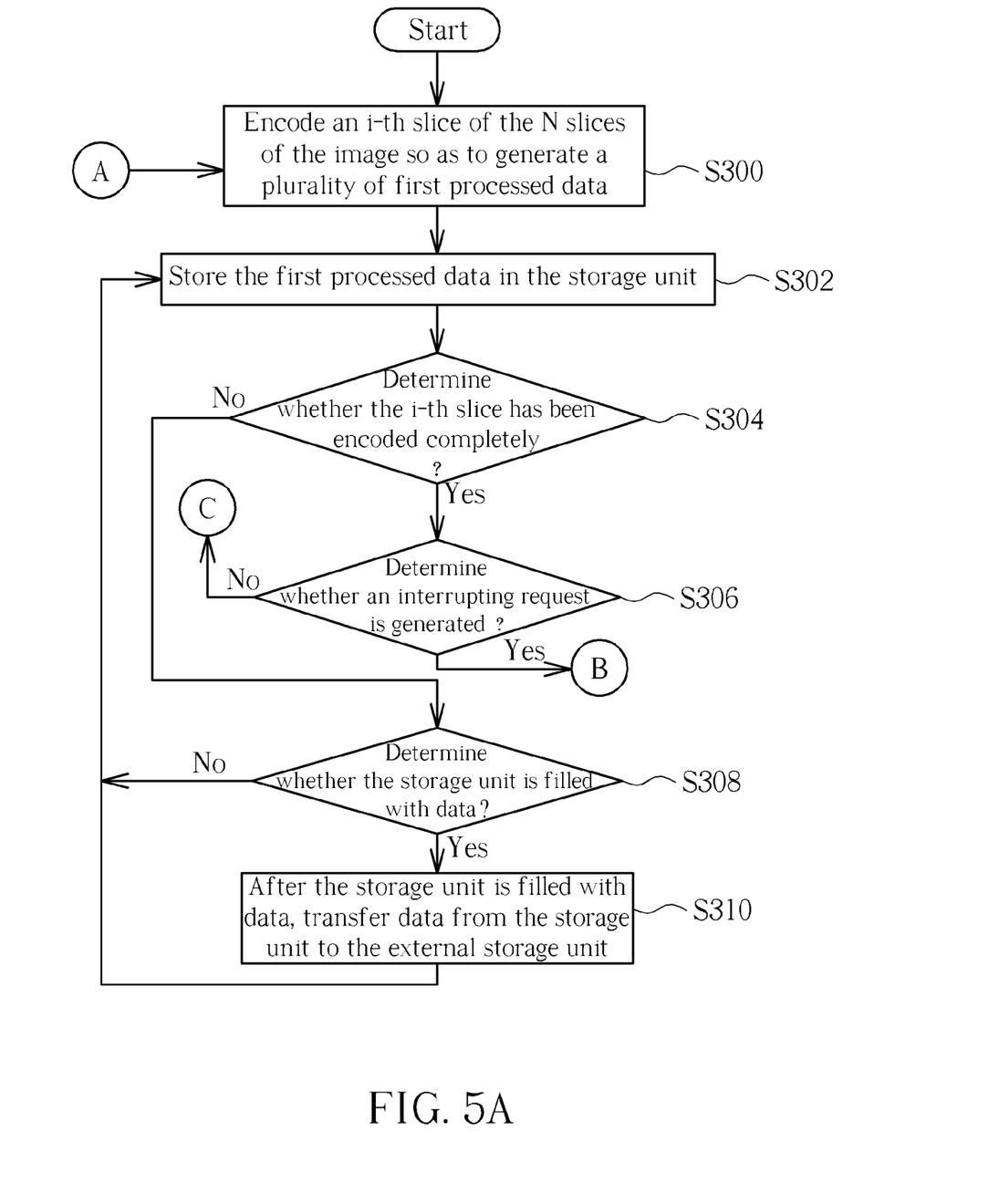
FIGS. 5A and 5B are flowcharts showing an image processing method according to a third embodiment of the invention.
Figure 5B:
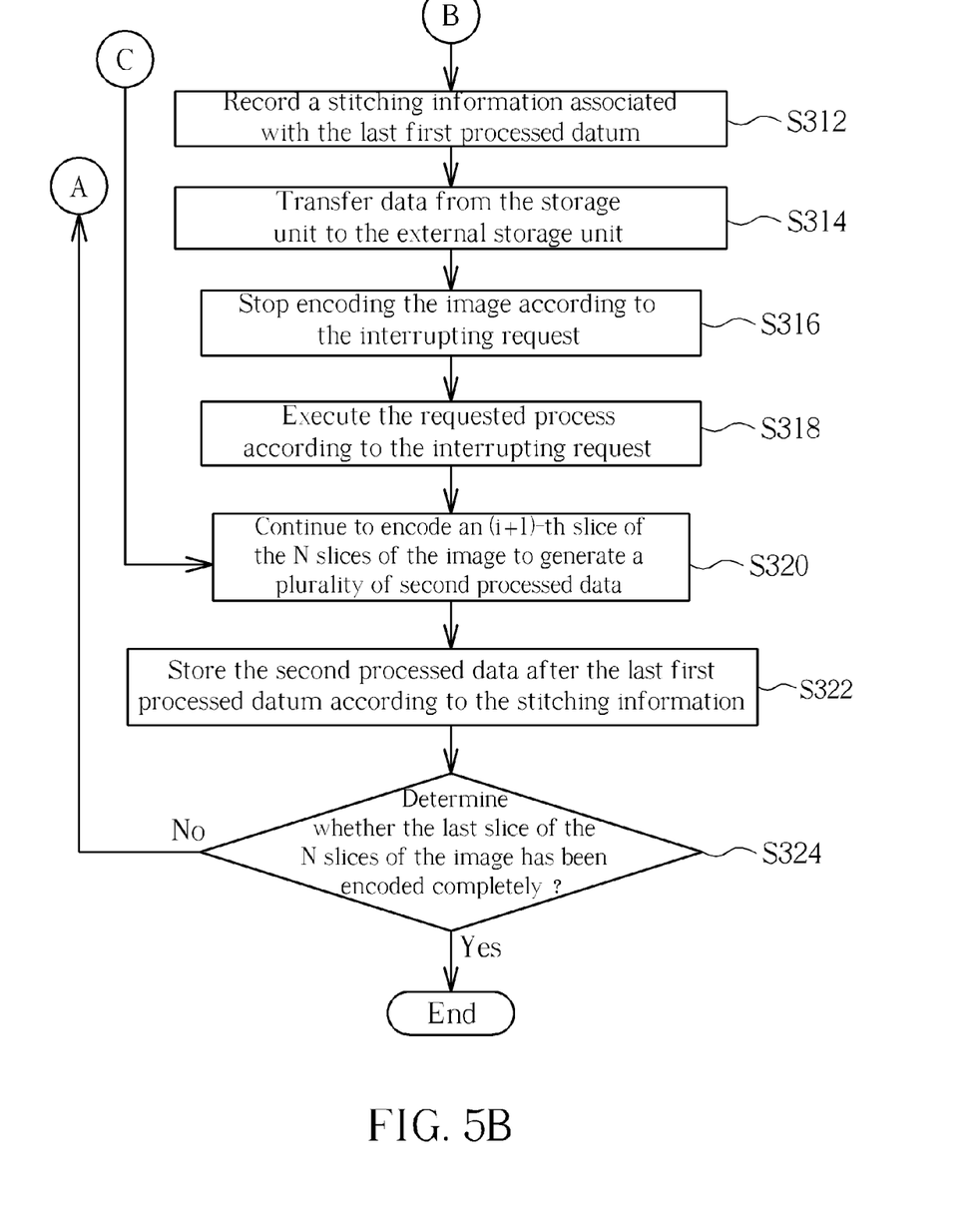

Referring to FIGS. 5A and 5B, FIGS. 5A and 5B are flowcharts showing an image processing method according to a third embodiment of the invention, wherein the third embodiment is adapted to bitstream output by the processing unit 10 or hardware structure is the same as the minimum unit of memory address. For example, the bitstream output by the processing unit 10 or hardware structure and the minimum unit of memory address are bit or byte. The main difference between the third embodiment and the aforesaid second embodiment is that the bitstream output by the processing unit 10 or hardware structure is limited to bit and the first processed data is limited to bit alignment.

Moreover, the image processing device 1 for implementing the third embodiment may or may not comprise the buffer unit 16. The following utilizes the image processing device without the buffer unit 16 to depict the third embodiment. The image processing device 1 with the buffer unit 16 can be also used to implement the third embodiment by referring to the aforesaid first or second embodiment and that will not be described herein again.

In step S302, the control unit 14 stores the first processed data in the storage unit 12 immediately. The stitching information recorded in step S312 comprises a bit address and/or valid bits and byte data of the last first processed datum within the storage unit 12. In other words, the stitching information may only comprise the bit address. Therefore, after the requested process is finished, the control unit 14 controls the processing unit 10 to continue to encode the (i+1)-th slice of the N slices of the image Img to generate a plurality of second processed data (step S320), wherein the second processed data is also limited to bit alignment. Afterward, according to the stitching information mentioned in the above, the control unit 14 reads the stitching information associated with the last first processed datum so as to determine the last valid data and then stores the second processed data after the last first processed datum in the storage unit 12 (step S322).

It should be noted that, the steps S300, S304-S310, S314-S318 and S324 of FIGS. 5A and 5B are substantially similar to the steps S100, S104-S106, S112-S114, S122-S126 and S132 of FIGS. 2A and 2B, so they will not be described herein again.

Still further, the image processing device 1 without the buffer unit 16 can be also used to implement the aforesaid first and second embodiments by referring to the aforesaid third embodiment (as shown in FIGS. 5A and 5B) and that will not be described herein again.

As mentioned in the above, the image processing device and the image processing method of the invention are capable of implementing bitstream stitching technique by the unit of bit, byte or more than one byte (e.g. double word). Once an interrupting request (e.g. browsing request or other operating/processing requests) is generated according to a requested process during image processing process, the device and the method of the invention will record the stitching information associated with the last processed datum after processing the current slice of the image, stop the image processing process, and execute the requested process according to the interrupted request. After the requested process is finished, the device and the method of the invention will continue to process the remained slices of the image from the last processed datum according to the stitching information. Accordingly, the device and the method of the invention not only can perform other functions (e.g. browsing previously captured image) requested by the user in time during the image processing process, but also can effectively reduce re-processing time of hardware.

Those skilled in the art will readily observe that numerous modifications and alterations of the device and method may be made while retaining the teachings of the invention.

What is claimed is:

1. An image processing method for processing an image, the image being divided into N slices, N being a positive integer larger than one, the image processing method comprising steps of:
processing an i-th slice of the N slices to generate a plurality of first processed data, i being a positive integer smaller than N;
storing the first processed data in a memory unit;
determining whether the i-th slice has been processed completely;
if the i-th slice has been processed completely, determining whether an interrupting request is generated;
once the interrupting request is generated according to a requested process, recording a stitching information associated with a last first processed datum of the first processed data;
stopping processing the image and executing the requested process according to the interrupting request;
continuing to process an (i+1)-th slice of the N slices to generate a plurality of second processed data after the requested process is finished; and
storing the second processed data after the last first processed datum in the memory unit according to the stitching information,
wherein the first processed data and the second processed data are aligned with each other via at least one alignment type selected from the group consisting of double word alignment, byte alignment, and bit alignment, and the stitching information comprises at least one selected from the group consisting of a double word address and valid bytes and double word data of the last first processed datum, a byte address and valid bits and byte data of the last first processed datum, and a bit address and valid bits and byte data of the last first processed datum.

2. The image processing method of claim 1, wherein the first processed data and the second processed data are limited to double word alignment and the stitching information comprises the double word address and valid bytes and double word data of the last first processed datum.

3. The image processing method of claim 2, further comprising step of:
storing the second processed data after the valid bytes of the last first processed datum in the memory unit according to the stitching information.

4. The image processing method of claim 1, wherein the first processed data and the second processed data are limited to byte alignment and the stitching information comprises the byte address and valid bits and byte data of the last first processed datum.

5. The image processing method of claim 4, further comprising step of:
storing the second processed data after the valid bits of the last first processed datum in the memory unit according to the stitching information.

6. The image processing method of claim 1, wherein the first processed data and the second processed data are limited to bit alignment and the stitching information comprises the bit address and/or valid bits and byte data of the last first processed datum.

7. The image processing method of claim 1, further comprising step of:
once the interrupting request is generated, calculating valid bytes or valid bits of the last first processed datum in the memory unit after the i-th slice has been processed completely.

8. The image processing method of claim 1, wherein the memory unit comprises a storage unit and/or a buffer unit.

9. The image processing method of claim 1, further comprising steps of:
if no interrupting request is generated, continuing to process the (i+1)-th slice of the N slices to generate the plurality of second processed data after the i-th slice has been processed completely.

10. The image processing method of claim 1, further comprising steps of:
determining whether a last slice of the N slices has been processed completely; and
if the last slice has not been processed completely, continuing to process the image until the last slice is processed completely.

11. An image processing device for processing an image, the image being divided into N slices, N being a positive integer larger than one, the image processing device comprising:
a memory unit;
a stitching information recording unit;
a processing unit for processing an i-th slice of the N slices to generate a plurality of first processed data, i being a positive integer smaller than N; and
a control unit for storing the first processed data in the memory unit and determining whether the i-th slice has been processed completely, if the i-th slice has been processed completely, the control unit determining whether an interrupting request is generated, once the interrupting request is generated according to a requested process, the control unit recording a stitching information associated with a last first processed datum of the first processed data in the stitching information recording unit and controlling the processing unit to stop processing the image and to execute the requested process according to the interrupting request, the control unit controlling the processing unit to continue to process an (i+1)-th slice of the N slices to generate a plurality of second processed data after the requested process is finished, and then the control unit storing the second processed data after the last first processed datum in the memory unit according to the stitching information,
wherein the first processed data and the second processed data are aligned with each other via at least one alignment type selected from the group consisting of double word alignment, byte alignment, and bit alignment, and the stitching information comprises at least one selected from the group consisting of a double word address and valid bytes and double word data of the last first processed datum, a byte address and valid bits and byte data of the last first processed datum, and a bit address and valid bits and byte data of the last first processed datum.

12. The image processing device of claim 11, wherein the first processed data and the second processed data are limited to double word alignment and the stitching information comprises the double word address and valid bytes and double word data of the last first processed datum.

13. The image processing device of claim 12, wherein the control unit stores the second processed data after the valid bytes of the last first processed datum in the memory unit according to the stitching information.

14. The image processing device of claim 11, wherein the first processed data and the second processed data are limited to byte alignment and the stitching information comprises the byte address and valid bits and byte data of the last first processed datum.

15. The image processing device of claim 14, wherein the control unit stores the second processed data after the valid bits of the last first processed datum in the memory unit according to the stitching information.

16. The image processing device of claim 11, wherein the first processed data and the second processed data are limited to bit alignment and the stitching information comprises the bit address and/or valid bits and byte data of the last first processed datum.

17. The image processing device of claim 11, wherein once the interrupting request is generated, the control unit calculates valid bytes or valid bits of the last first processed datum in the memory unit after the i-th slice has been processed completely.

18. The image processing device of claim 11, wherein the memory unit comprises a storage unit and/or a buffer unit.

19. The image processing device of claim 11, wherein if no interrupting request is generated, the control unit controls the processing unit to continue to process the (i+1)-th slice of the N slices to generate the plurality of second processed data after the i-th slice has been processed completely.

20. The image processing device of claim 11, wherein the control unit determines whether a last slice of the N slices has been processed completely, and if the last slice has not been processed completely, the control unit controls the processing unit to continue to process the image until the last slice is processed completely.

* * * * *